(12) United States Patent
Krouse et al.

(10) Patent No.: US 8,558,402 B2
(45) Date of Patent: Oct. 15, 2013

(54) METHOD AND APPARATUS FOR IMPROVED HYDROPOWER GENERATION AT EXISTING IMPOUNDMENTS

(75) Inventors: Wayne F. Krouse, Mount Brook, AL (US); Harvey Greenberg, Houston, TX (US)

(73) Assignee: Hydro Green Energy, LLC, Westmont, IL (US)

( * ) Notice: Subject to any disclaimer, the term of this patent is extended or adjusted under 35 U.S.C. 154(b) by 416 days.

(21) Appl. No.: 12/864,917

(22) PCT Filed: Mar. 24, 2010

(86) PCT No.: PCT/US2010/028392
§ 371 (c)(1),
(2), (4) Date: Jul. 28, 2010

(87) PCT Pub. No.: WO2010/111318
PCT Pub. Date: Sep. 30, 2010

(65) Prior Publication Data
US 2011/0089695 A1    Apr. 21, 2011

Related U.S. Application Data

(60) Provisional application No. 61/163,694, filed on Mar. 26, 2009.

(51) Int. Cl.
*F01D 15/10*    (2006.01)
*F02C 6/00*    (2006.01)
*H02K 7/18*    (2006.01)
*H02P 9/04*    (2006.01)

(52) U.S. Cl.
USPC .......................................................... 290/52

(58) Field of Classification Search
USPC ............................. 290/42, 43, 52–54; 405/78
See application file for complete search history.

(56) References Cited

U.S. PATENT DOCUMENTS

| 4,468,153 | A | 8/1984 | Gutierrez Atencio |
| 4,755,690 | A | 7/1988 | Obermeyer |
| 4,804,855 | A | 2/1989 | Obermeyer |
| 6,281,597 | B1 | 8/2001 | Obermeyer et al. |
| 2004/0222641 | A1* | 11/2004 | Panholzer ....................... 290/43 |
| 2009/0015015 | A1* | 1/2009 | Joutsiniemi ..................... 290/54 |

FOREIGN PATENT DOCUMENTS

WO    WO 03/054385    7/2003

\* cited by examiner

*Primary Examiner* — Javaid Nasri

(57) ABSTRACT

A floatable or moveable and/or fixed frame for insertion of power generating modules to generate power from impounded water through the frame in lock and dam and other settings presenting head potential and moving water. The frame is prefabricated and moved onto site as a module or modules, or as a ballastable marine hulled device with positions in the frame for insertion of modular elements including a generator, a turbine and a spacer for configuring a generating cell in different positions within the frame. A gantry positioned on the frame permits easy movement of individual modules into position.

19 Claims, 9 Drawing Sheets

METHOD AND APPARATUS FOR IMPROVED HYDROPOWER GENERATION AT EXISTING IMPOUNDMENTS

CROSS REFERENCE TO RELATED APPLICATIONS

This application is based on provisional patent application No. 61/163,694 entitled "Method and Apparatus for Improved Hydropower Generation at Locks and Dams" filed on Mar. 26, 2009, which is incorporated by reference as if fully set forth herein.

FIELD OF THE INVENTION

The present invention relates to power generating systems, and more particularly to A Method And Apparatus For Improved Hydropower Generation At Existing Impoundments.

BACKGROUND ART

Prior attempts at extracting power from pre-existing water impoundments such as dams and lock systems involved building temporary cofferdams, dewatering the volume inside the cofferdam, and excavating a pit "in the dry" for the civil infrastructure to support the powerhouse and its equipment from static and dynamic loads. Systems having low net head available present marginal opportunity for "conventional" hydropower due to the very high cost of the temporary cofferdam and other civil infrastructure. There exist many lock and dam environments having active navigational locks and unused auxiliary locks. While possible, although very unlikely, the need to use auxiliary locks for future navigation would require a removable hydropower system design which is not available with conventional hydropower systems. Further, the economics of long lead times for project development, engineering design, licensure, equipment fabrication, civil construction and commissioning (up to 8 years) can make permanent conventional/traditional hydropower systems economically and in some cases physically and operationally impractical.

SUMMARY OF THE INVENTION

There exists a need for a configurable system of power generating modules and a support frame for insertion at locations where impounded water is present. Among other locations, lock and dam structures present great potential for utilizing unused impoundments for the generation of hydroelectric power. By working within an existing lock, one minimizes the impact to the environment and reduces the total installation cost and Levelized Cost of Electricity (LCOE) when compared to conventional hydro power, In some cases, the existing auxiliary lock infrastructure has never been used (since in some cases it is partially complete) and likely never will be used for the additional locks that exist at many sites for a variety of reasons. In some embodiments, the system of the present invention may also be used at any location where a body of water is present and there exists an ability to move a portion of that water through the frame of the present invention.

In accordance with a preferred embodiment of the invention, there is shown a machine for power generation through impoundment of water having a selectively bouyant and moveable frame disposed within a channel of moving water, a plurality of power generating cells positioned in the frame in predetermined positions, the cells composed of interlocking stacking modules mounted in the frame including a generator module, one or more spacing module(s) and a turbine module, a moveable mount on top of the frame for lowering and raising the modules into pre-determined positions on the frame, the turbine module is positioned to receive energy from the movement of water, wherein the turbine module converts the potential energy created by the impounded water into mechanical/kinetic energy by the movement of the turbine within each cell, which in turn drives a generator that converts the mechanical energy into electrical energy In accordance with another preferred embodiment of the invention, there is shown a machine for power generation through impoundment of water having a floatable frame disposed within a channel or body of water, a plurality of power generating cells positioned in the frame in predetermined positions, the cells composed of interlocking stacking modules mounted in the frame including a generator module and a turbine module, and the cells positioned to receive energy from the movement of water through the frame.

In accordance with another preferred embodiment of the invention, there is shown a gate disposed about a body of water having predetermined positions for insertion of a power generating cell having a least one interchangeable turbine set into a predetermined position in the frame, at least one electrical power generating means stacked in vertical position with respect to the turbine and its predetermined position within said frame, at least one coupling member for engaging the at least one interchangeable turbine with the power generating means to create a power generating cell, wherein the at least one interchangeable turbine and the at least one power generating means cooperate to generate electrical power. Such system including "knee" or other downstream braces to offset tipping forces and distribute horizontal shearing loads from the impounded water against said frame.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DESCRIPTION OF H INVENTION

Traditional navigational locks & dams ("L&D") are a type of water impoundment that facilitates river flood control and navigation in two ways: 1) By controlling the flow of the river thereby adjusting the level of the pools created above and below the dams in order to provide flood control, and a channel deep enough for navigation and 2.) By determining the number of cycles of the locks and adjusting the water level in between the lock doors in order to raise or lower vessels transiting the lock & dam.

The present invention embodies a frame which incorporates a group of interconnected hydropower turbine generators and uses the "head" (or vertical differential level of the water) potential energy provided by the existing impounding dam to create a hybrid hydropower facility. By supplementing the traditional lock doors with new frame(s) incorporating the innovative hydropower turbine system an existing impounding darn and lock becomes a hydropower facility. This lock frame may also find use at a variety of locations including dams that impound reservoirs, canals, aqueducts, discharge water at power plants and other sites where impounded water is present. The lock frame module may also be used in a navigable lock by adding equipment to raise and lower it or open it on one or more hinged elements. In this configuration it would effectively replace a lock door. It may also be used a floating caisson (hull) that can be floated in and out of the lock to allow for navigation.

In a typical navigational lock, there are two sets of doors, commonly referred to as the upper gate and the lower gate. Each gate typically consists of two doors (there are cases where a single door is used); when the doors of the gate are closed they span the entire channel of the lock. The design in accordance with a preferred embodiment of the present invention contemplates that a plurality of large, modular, interconnected and interchangeable turbines will be installed in a moveable frame, which could replace one or more lock doors in a navigable lock, with each turbine connected to its own generator. In a preferred embodiment, frame may have two or more turbines. In a floatable frame, there may be a plurality of power generating cells composed of a combination of generator and turbine, and the frame could span the width of the channel. The design in accordance with a preferred embodiment of the present invention contemplates that the turbines/generators can be removed vertically from their frames for maintenance by an inexpensive bridge crane mounted on top of the assembly. Additionally, these generator frames or turbine frames can be repositioned into pre-determined locations.

Figure 1:
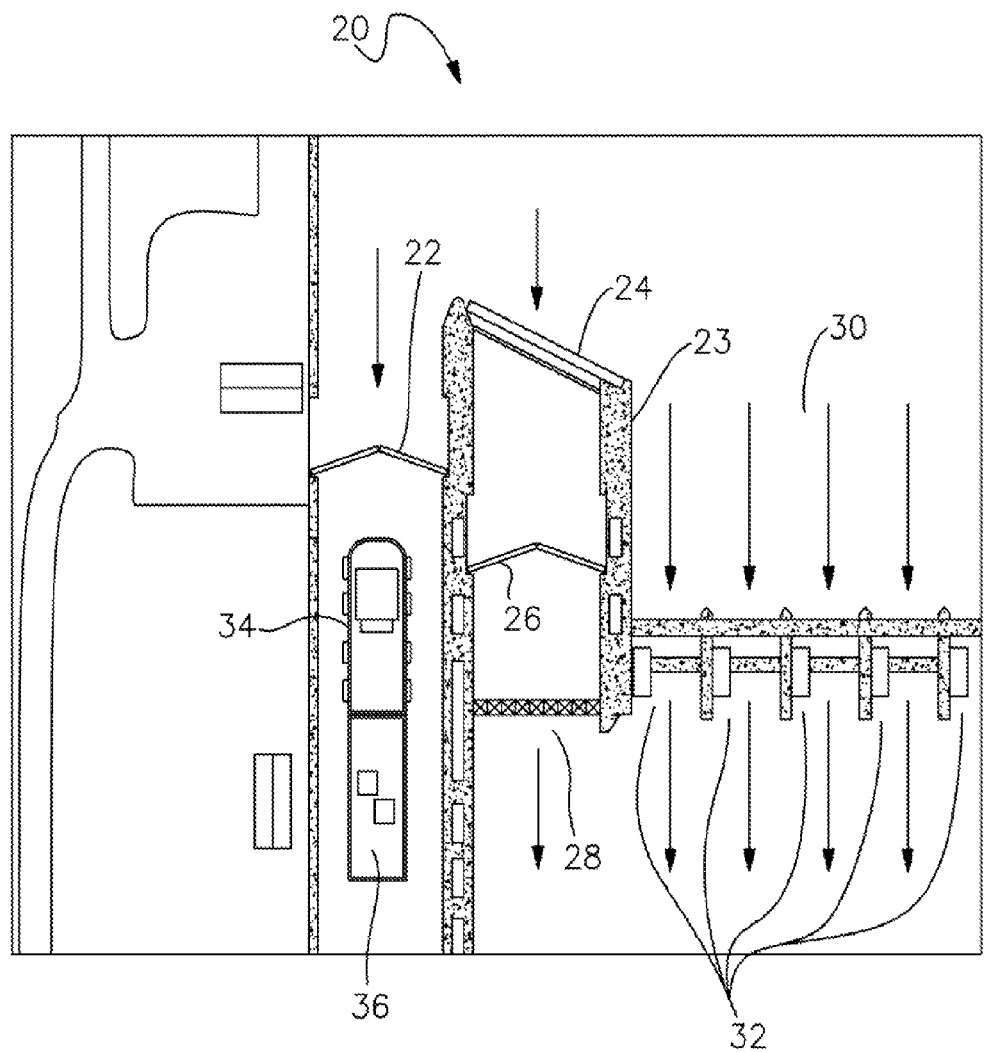
FIG. 1 shows a schematic diagram of a water impounding lock and dam structure in accordance with a preferred embodiment of the invention.

Turning to FIG. 1, there is shown a lock and dam 20 with spillway 30 with water flowing in the direction of the arrows. Positioned on the left is an active lock 22 for navigational purposes and a lock 23 that is incomplete and not in use. Lock 22 may have tugboat 34 that moves barge 36 through the lock in a conventional manner. The use of the active lock 22 does not interfere with the generation of power in accordance with a preferred embodiment of the invention, nor does generation of power interfere with the normal use of lock 22. Lock 23, being inactive, is available for insertion of the lock frame module 28 in accordance with a preferred embodiment of the invention. Positioned upstream before the water entry point of lock 23 is a debris screen 24 that limits entry of large debris into the flow path of the, lock frame module. Lock doors 26 positioned before lock frame module 28 can be opened to allow flow of water and generation of power through the lock frame module. Lock frame module 28 is preferably pre-constructed at a different location from its ultimate deployment and then floated into position using ballastable barges or a caisson styled marine hull structure more fully described below. Similarly, and as more fully described below, individual modules for placement inside the frame may be pre-fabricated off site and moved into position at the location of the finished system. This allows for modularization and construction to fit different environments offsite and then placement of the lock frame in the desired location. The sub frames are stackable and have special pin assemblies to automatically align the internal modules during placement inside of the frame. To the extent any pilings and piling caps are needed to mount the lock frame module, they may be fully submerged and below the levels anticipated for navigation. In this way, the minimal preset pilings needed for insertion of the lock frame reduce on site construction needs. Pilings are more fully described in connection with FIG. 6 below.

Figure 2:
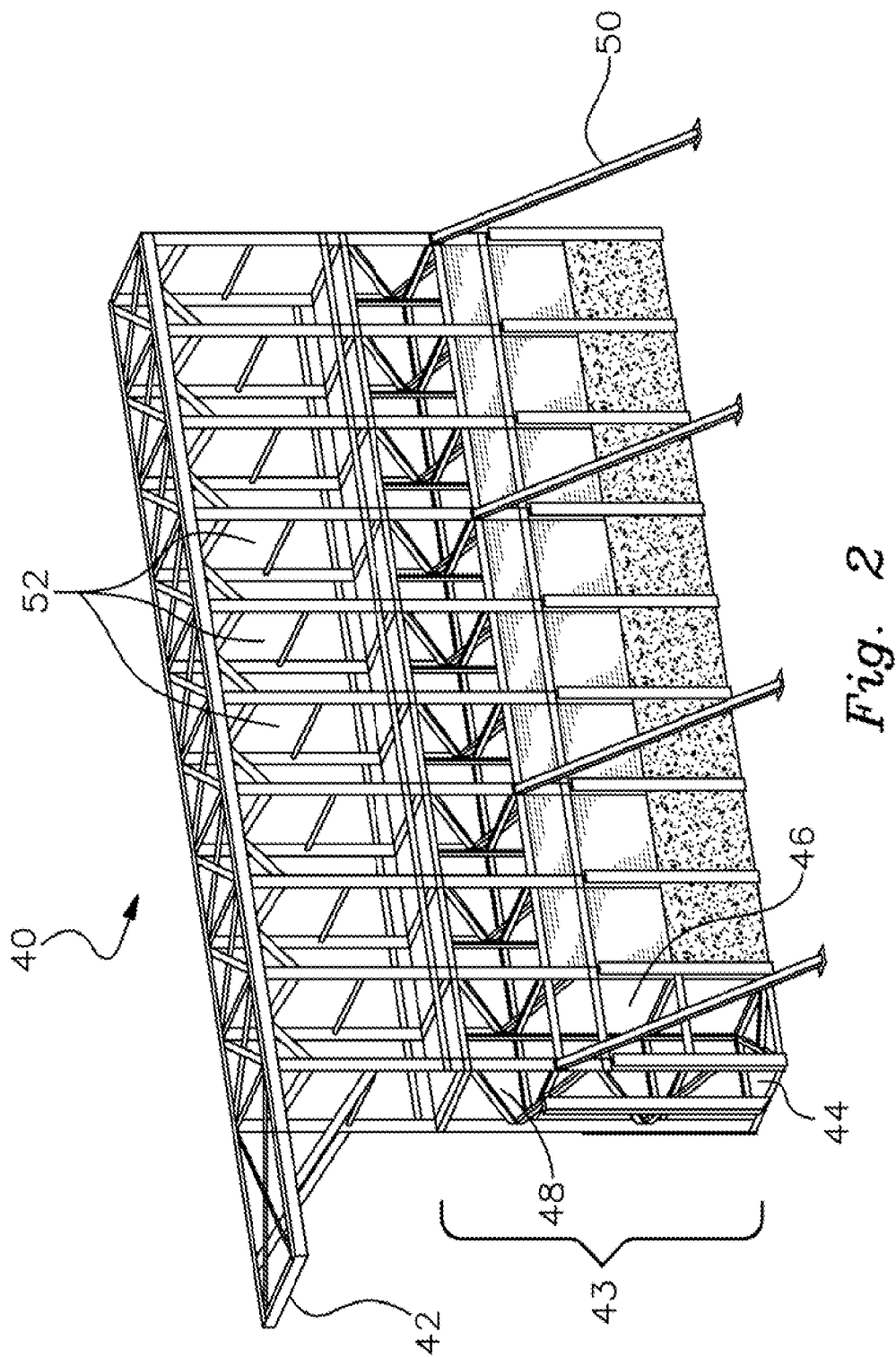
FIG. 2 shows an empty lock frame module in accordance with a preferred embodiment of the invention.

FIG. 2 shows empty lock frame module 40 with gantry assembly 42 for loading internal modules into the spaces designed to accommodate turbine frame module 44, spacer module or modules 46 and generator module 48. The stacked modules shown later in FIGS. 7A and 7B would be accommodates in the space referred to by the designation 43. Lock frame 40 may be stabilized by braces 50 upon installation. Gantry assembly 42 is positioned over the main lock frame module to facilitate installation of the various components of the present invention. Gantry assembly 42 is positionable to place individual modules in a plurality of separate locations 52 of which three representative ones are identified. As more fully described in FIG. 3, each module may be installed overhead above the water line. Each of these components—turbine, spacer and generator may be lowered into position in the frame or door through use of a gantry crane, bridge crane or other rolling type crane that is operable along the length of the frame.

Figure 3:
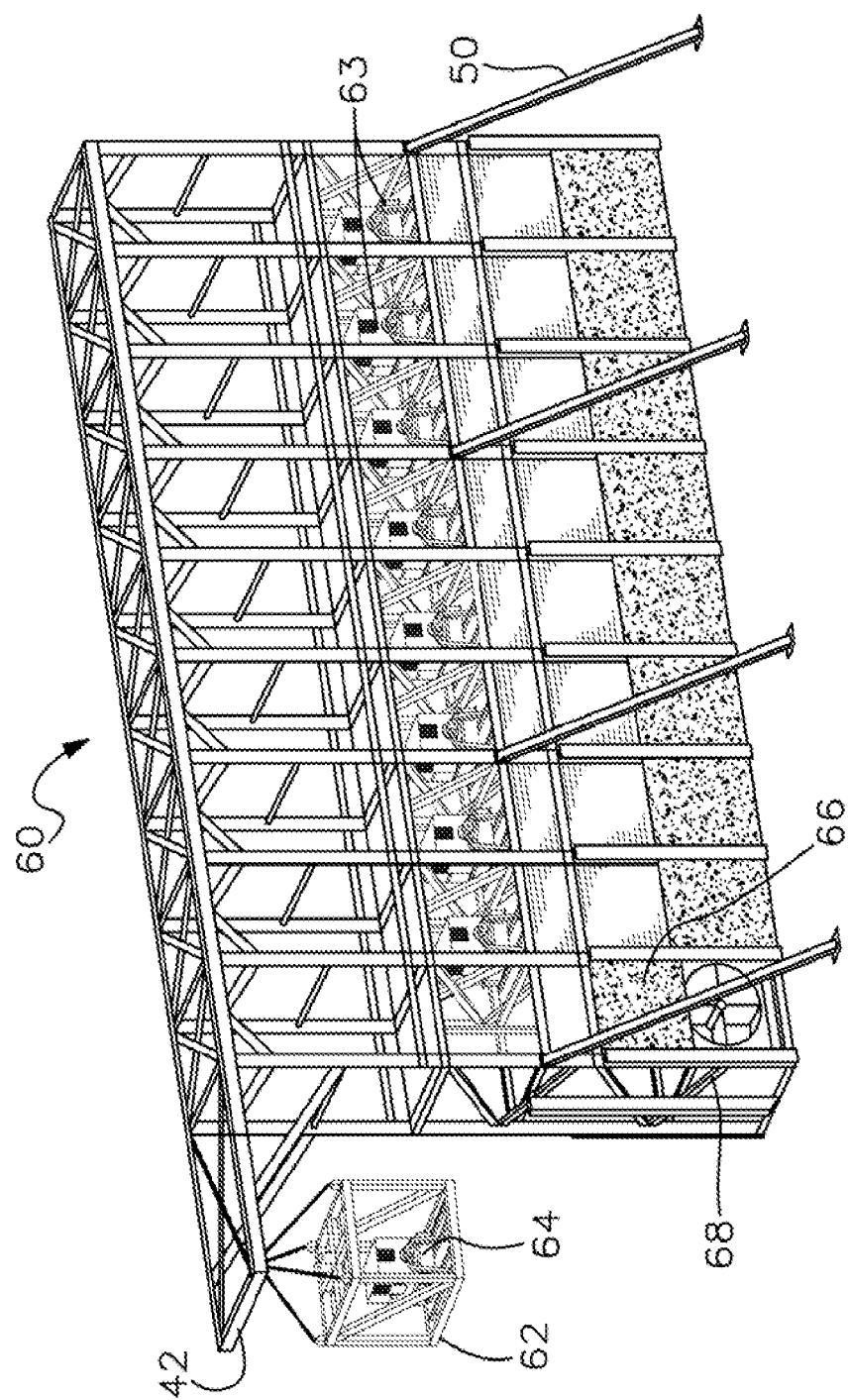
FIG. 3 shows a lock frame module with the turbine, spacer and generator modules and gantry in accordance with a preferred embodiment of the invention.

FIG. 3 shows a partially loaded lock frame 60 with a plurality of generators 63 already in place. Gantry assembly 42 moves generator frame module 62 along the longitudinal axis of the gantry assembly and positions the selected piece over its frame position for installation. As an illustrative examplethe generator module 62 is loaded from a floating vessel 90 (shown in FIG. 5) and lifted to the height of gantry assembly 42 for movement along the longitudinal axis of gantry assembly 42 over the desired position. FIG. 3 shows generator frame module 62 with integral generator 64, being moved by the gantry for placement into its operating position. In similar manner turbine frame module 68 had been previously moved into position and lowered into its appropriate slot. Sliding door 66 (stop log) may be employed in certain embodiments to permit selective water flow over a particular turbine, in this instance the turbine in turbine frame module 68. Sliding door 66 may be operable by mechanical, pneumatic or hydraulic mechanisms well known in the art and done so in a dampened manner to more easily open and close the door. Sliding door 66 may also have a aeorofoil configuration on one edge to facilitate flow about said door and better dampen it during movement. Gantry assembly 42 may be configured to be a separate module so that it may be installed onto frame 60 at or close to site during initial system installation. This option has been primarily added improve logistics when river transportation of the assemblies must pass under height restricting structures (low bridges, power cables, etc.).

Figure 4:
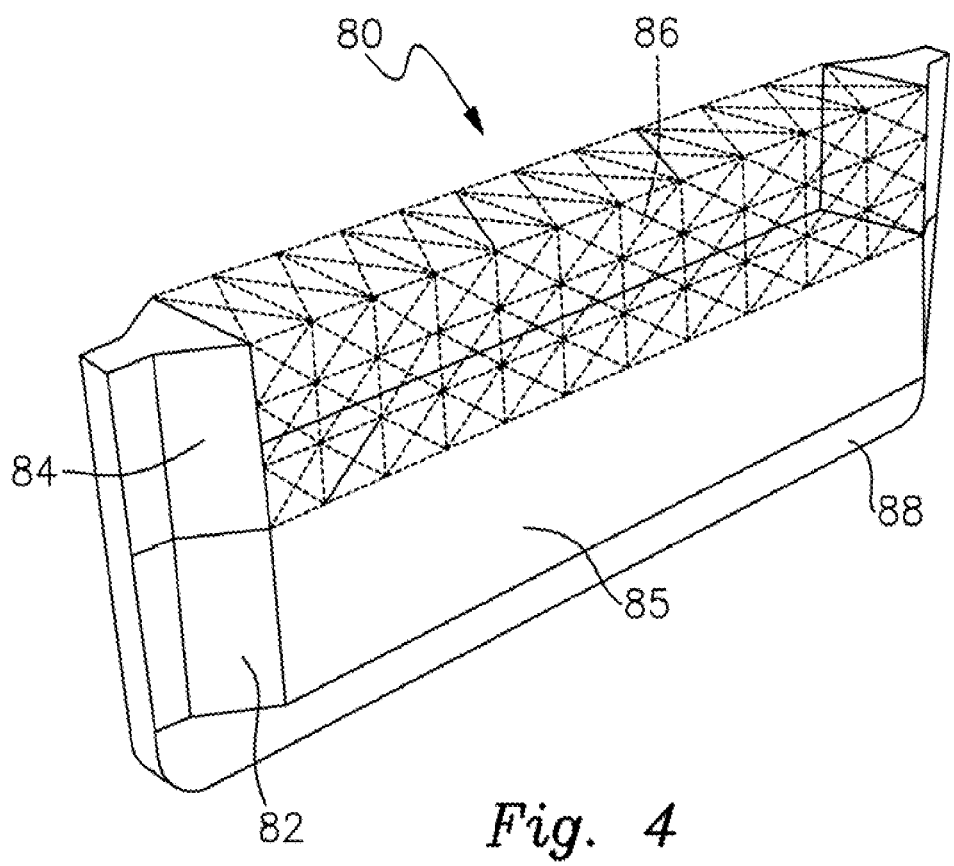
FIG. 4 shows a floating and ballastable caisson and lock frame as a self contained marine hull in accordance with a preferred embodiment of the invention.

FIG. 4 shows a ballastable caisson flottation structure 80 with schematic integral lock frame modules 86 positioned above buoyant compartments 82, 84 and 85. Main ballast tank 85 provides the buoyancy to support the load presented by the internal frame modules 86. Trim tanks 82 and 84 may be employed for additional control over buoyancy. At the bottom of caisson floatation structure 80 is concrete ballast tank 88 which provides stabilization and further ballasting. Caisson structure 80 may be of any a variety of marine type structures common to ship hulls and the like. It is intended to be a ballastable marine hull for transportation and positioning of a lock frame module in accordance with a preferred embodiment of the invention. The architecture and construction of such caissons is well known in the art and need not be described in further detail here. However, no portable and removable hydropower system with a marine hull for transportation has been described in the art. In many embodiments of the invention it may be desirable to mount the lock frame module on a more permanent structure rather than a floating or buoyant hull as described here. However, in some configurations, the lock frame module will be preferably mounted on some kind of floating structure that is more easily guided into position by a tugboat or other marine vehicle.

Figure 5:
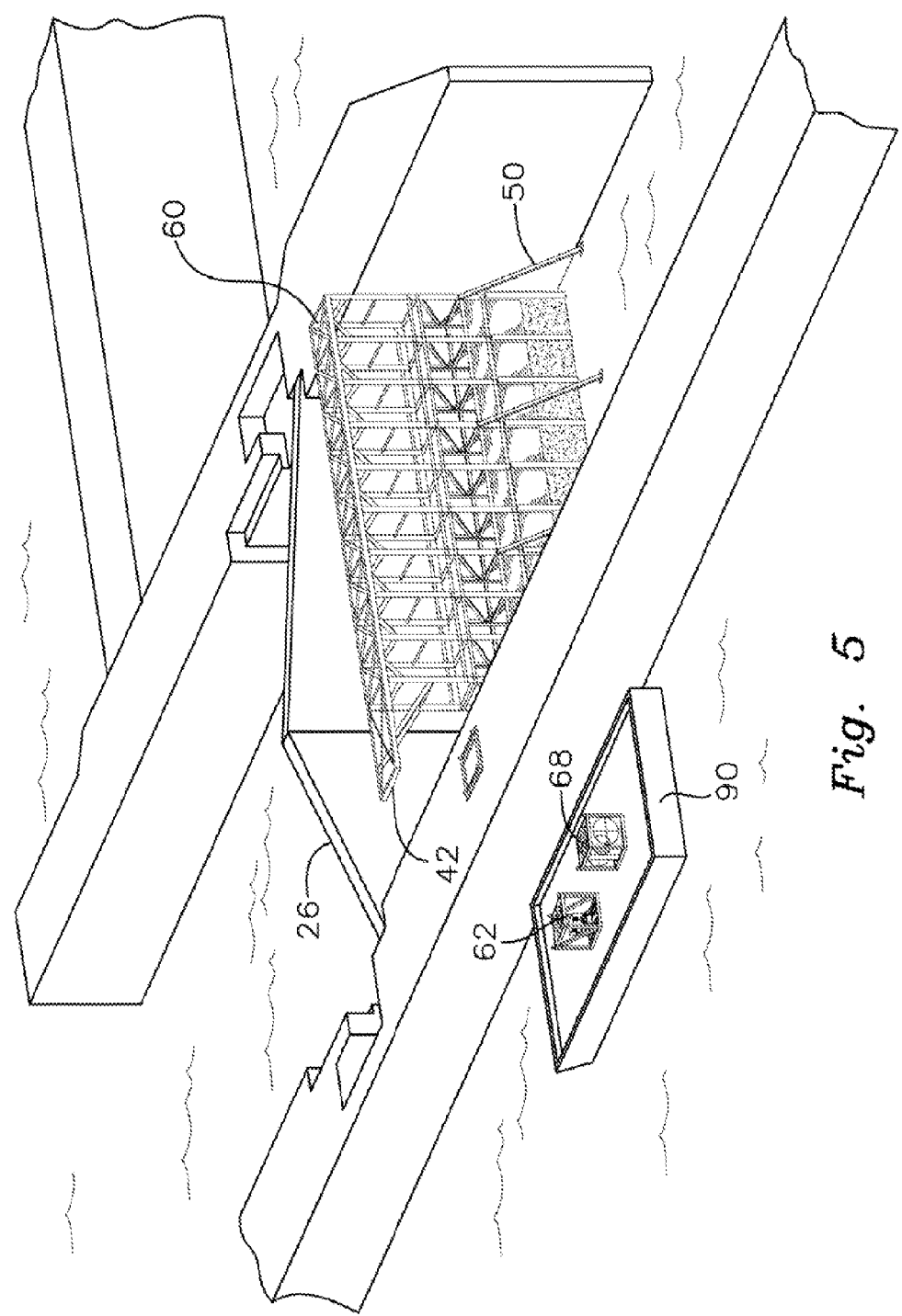
FIG. 5 shows an empty lock frame module positioned in a lock in accordance with a preferred embodiment of the invention.

FIG. 5 shows an installed lock frame 60 adjacent lock doors 26 for generation of power from the impoundment of water through the lock. Lock gates 26 must he opened to allow water to pass through lock frame 60 to generate energy. Barge 90 is positioned proximate to gantry 42 to permit easy attachment of the gantry crane to for example, generator frame module 62 or turbine frame module 68. As each desired module is selected for installation, gantry assembly 42 moves the module off of barge 90, up to the appropriate height of lock frame 60 and in turn over the position in the lock frame to which the desired module is being installed. Barge 90 and gantry 42 can also be used for maintenance operations, removing existing modules and installing replacements. Each of the generator, spacer and/or turbine frame modules can be easily and efficiently moved into its position in the array of generating cells formed by the combination of the generators and turbines. As more fully described below, the generator and turbine for a particular power generating cell are interconnected to create power upon movement of the turbine. In the particular embodiment shown in FIG. 5, there are nine generator/turbine combinations. By using multiple units in parallel, variable wicket gates are not needed, as the multiple unit configuration provides flow turndown in small steps (in the case of the nine units shown in the figures, flow can be regulated in 11.1% steps by shutting off individual turbines. In this way, the individual parts of a turbine/generator combination are modular, removable and interchangeable into a plurality of pre-determined configurations. It also allows for variance in the vertical dimension of the combination of turbine, generator and spacer by changing the size of the spacer and the overall height of the lock frame module. In certain conditions, the system can be reconfigured to act as an alternative spillway by allowing water to pass through the doors and then through the turbine openings, even if no electricity is being generated. In this way the system creates regulated spillway capacity where none existed before.

Figure 6:
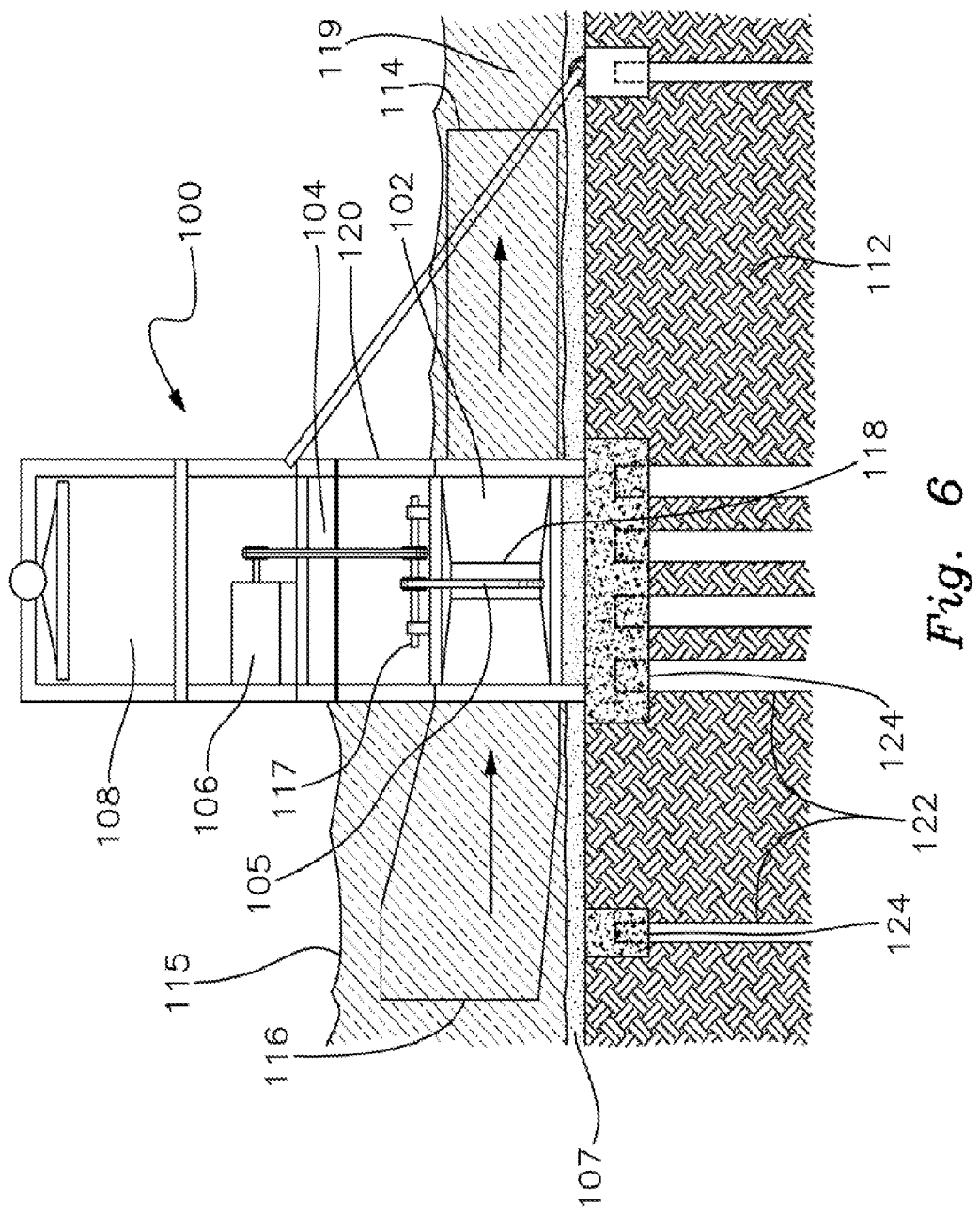
FIG. 6 shows a side elevation of a lock frame module with one of the options for the supporting civil infrastructure in accordance with a preferred embodiment of the invention.

FIG. 6 shows a side view of a lock frame module 100 having a turbine 102 positioned to received water through an inlet tube 116, which can be a fabricated structure or precast concrete such as a culvert. The water upstream of the lock frame module has head potential due to the higher elevation of its surface 116 and creates energy by flowing through the inlet tube 116 through turbine 102 and out draft tube 114 which can also be a fabricated structure or made of precast concrete into tailrace water 119. Turbine 102 is operably connected to generator 106 by chain drive 105 system driven externally from the shroud 118 that is integral to the turbine's propeller assembly, driving an intermediate shaft (jackshaft) 117 which is chain or belt 104 connected to the generator 106. This system also acts as the speed increaser. Preferably, turbine 102 utilizes marine style fixed pitch propellers without wicket gates or variable pitch blades. As is readily apparent, the operative mechanical connections between the turbine and the generator do not require lubricants since they are below the water line, hence the shaft bearingsare water lubricated. This design is environmentally safer and provides for easier servicing of the mechanical moving parts.

Alternatively, power from turbine 102 via shroud 118 may be transferred to the generator through a pinion gear and pinion shaft (not shown) directly or indirectly connected to generator 106 via another gear. In this embodiment, power is transferred from the rotating shroud without the need for an intermediate belt or chain which in some settings may produce preferable results. The use of direct drive system with pinion gear and shaft in a closed modular system utilizing the technology disclosed herein has potential benefits in higher power applications, or higher rotational speeds.

Lock frame module 100 is mounted on piling caps 124 that are below silt line 107 placed onto on pilings 122 that have been driven, augured or otherwise appropriately placed into the soil 112. Piling caps 124 are fully submerged with their tops below navigational levels. Alternatively, in locks with structural slabs that can bear the wight of the lock frame module system, the lock frame module can be directly placed on structural elements to spread the load over a wide area, avoiding the need to penetrate existing subsurface structures and soil.

Figure 7A:
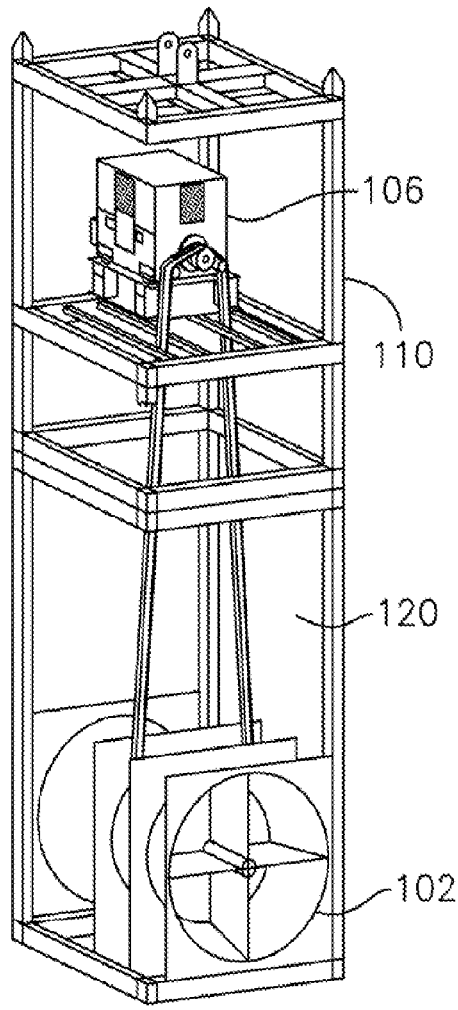
FIG. 7A shows a perspective view of power assembly having stacked turbine, spacer and generator modules in accordance with a preferred embodiment of the invention.
Figure 7B:
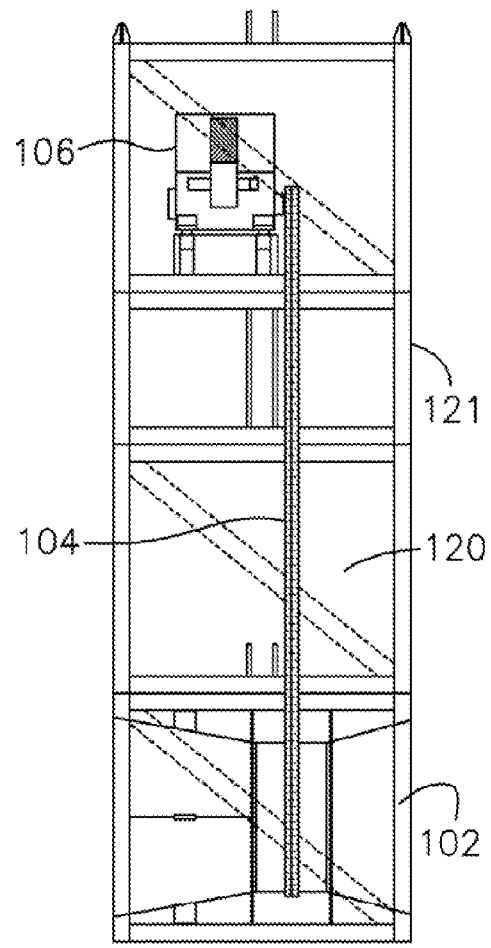
FIG. 7B shows a side elevation view of a power assembly having stacked turbine, spacer and generator modules accordance with a preferred embodiment of the invention.

FIG. 7A shows a perspective view of a single generator frame module, spacing module and turbine frame module vertically stacked and FIG. 78 shows an elevation view of a single generator and turbine combination vertically stacked. In the embodiment shown in FIGS. 7A and 7B, power is transferred from turbine 102 directly via chain drive or belt 104 without an intermediate belt or shat. These figures show an alternative drive configuration that does not use an intermediate shaft. The figures also show the use of two spacer modules, the smaller above the larger. Turbine 102 is shown operably connected to generator 106 which sits in generator frame module 110. For ease of viewing, spacer module 120 is only shown in FIG. 7B but is located preferably above turbine 102 and below generator frame module 110. Spacer module 120, partially shown in FIG. 78 is a structural unit that may be lowered into place within the lock frame module and configured to meet the specific height requirements of the site. Also shown is auxiliary spacer module 121 which in certain configurations may be desired for further separation of the generator and turbine for higher net head applications. The entire vertical train of equipment or power modules, including the turbine 102, intermediate drive chain 104, spacer module 120 and generator module 110, may be removed from the lock frame module and replaced in less than a day. As is more fully described above, the various components of a single generator and turbine combination may be lowered via gantry crane mounted on the top of the kick frame module and inserted within its position in the array of turbines/generators. In certain embodiments there may be a turbine and mating generator separated by a variably sized spacer that all slot into receiving slots in the door. In this way, the individual parts of a turbine/generator combination are modular, removable and interchangeable to pre-determined positions. It also allows for variance in the vertical dimension of the combination of turbine, generator and spacer by changing the size of the spacer to accommodate a different height for the available head at a particular location. In a preferred embodiment, generators may be low cost, off-the-shelf OEM generators (induction, DC, AC, synchronous, permanent magnet etc.) which take advantage of newest system technologies being currently driven by the wind turbine and other industries. Further, there is no need for a gear box by use of a simple chain and belt drive system which provides speed increase using field replaceable, easily monitored and serviced solutions.

Figure 8A:
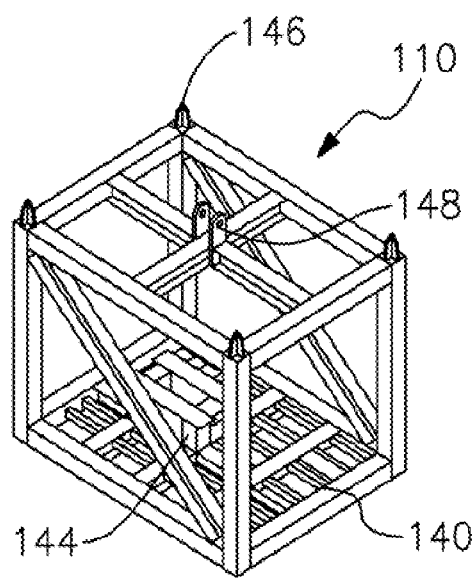
FIG. 8A shows a perspective view of an empty generator frame module in accordance with a preferred embodiment of the invention.
Figure 8B:
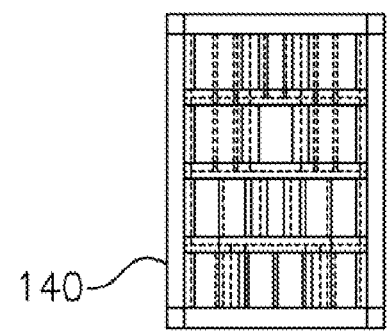
FIG. 8B shows a plan view of an empty generator frame module in accordance with a preferred embodiment of the invention.
Figure 8C:
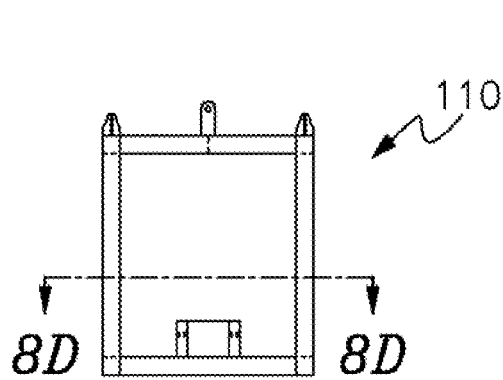
FIG. 8C shows a side elevation of an empty generator frame module with line A-A.
Figure 8D:
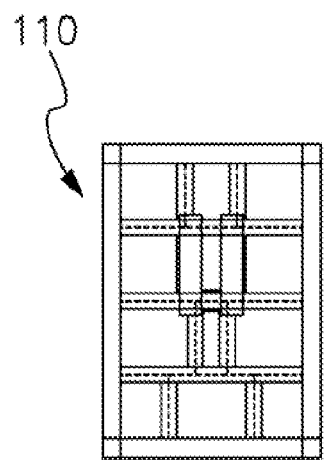
FIG. 8D is a view along line A-A of FIG. 8C.

FIGS. 8A, 8C, and 8D show an empty generator frame module 110 in perspective, front elevation and along section A-A of FIG. 8C respectively. FIG. 8B shows detail of the grating support 140. Mounted on grating support 140 is generator support 144 for mounting a generator. Grating support 140 provides additional support for the generator and constitutes the floor of generator frame module 110. Pins 146 are positioned on the four corners of frame module 110 and are shown on spacer module 120 and turbine module 102 and provide self centering mounting points for stacking of the different modules on top of each other. Tabs 148 as shown in FIGS. 8A and 8C provide lifting points for the modules.

Figure 9:
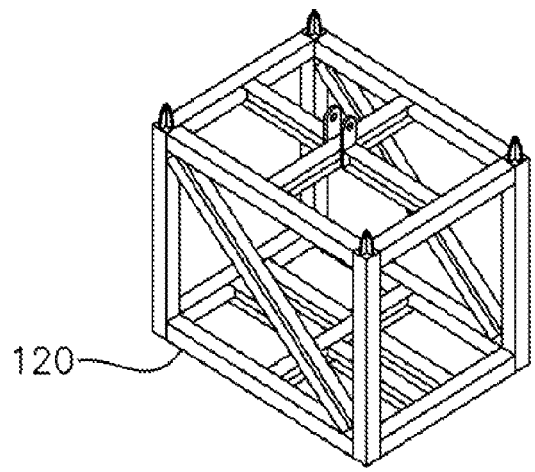
FIG. 9 is a perspective view of a spacer frame module in accordance with a preferred embodiment of the invention.
Figure 10A:
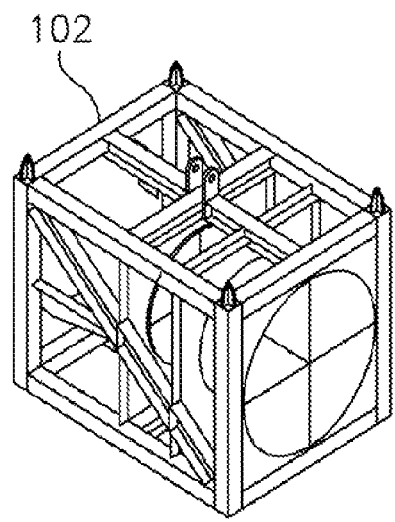
FIG. 10A shows a perspective view of a turbine frame module in accordance with a preferred embodiment of the invention.
Figure 10B:
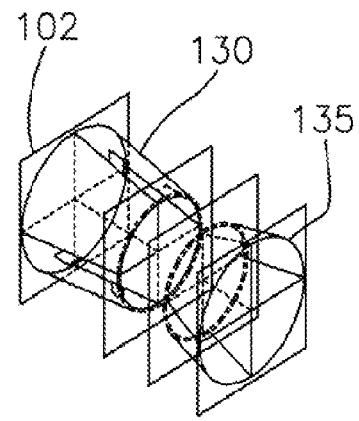
FIG. 10B shows a schematic perspective view of a turbine having converging and diverging ducts (turbine inlet and draft tube respectively) and methods to attach said ducts to the removable internal turbine frame in accordance with a preferred embodiment of the invention.

FIG. 9 shows spacer module 120 for insertion between a turbine module and generator module as previously described, On the bottom of spacer module 120 are receiving holes or depressions (not shown) for mateable engagement of pins 146 as described in FIG. 8A. Each of the turbine, generator, and spacer modules have receiving holes or depressions for mateable engagement. Spacer module 120 may be of any of a variety of heights to accommodate the particular desired configuration or can be a vertical, stack of multiple spacing modules. FIG. 10A shows turbine frame module 102 showing in partial form the inlet duct of the turbine. FIG. 10B shows in schematic form the converging inlet duct 135 and diverging outlet duct (the draft tube) 130. As previously described in FIG. 6, rotating shroud 118 is connected between the two ducts for rotatable engagement of the turbine to the drive chain or belt via a large sprocket and thus to the generator.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the compositions and methods of this invention have been described in terms of various embodiments, it will be apparent to those of skill in the art that other variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. A machine for power generation through the impoundment of water comprising:
    a transportable frame disposed within or connected to an impoundment that impounds water;
    a plurality of power generating cells positioned within said frame in a plurality of predetermined positions;
    said cells composed of selectively removable interlocking stacking modules vertically mounted in said frame including a generator module and a turbine module, wherein said modules are interchangeable with each other in different positions in the frame without interrupting power in other cells;
    said cells are positioned to receive energy from the impoundment of water,
    wherein said cells convert said energy by the movement of said water through the turbine and the rotation of the turbine within each cell.

2. The machine for power generation through the impoundment of water of claim 1 wherein said cell includes at least one spacer module for selectively positioning said turbine module in one of said positions.

3. The machine for power generation through the impoundment of water of claim 2, wherein the at least one modularly mounted turbine and the at least one spacer module may be selectively disposed in horizontal and vertical combinations.

4. The machine for power generation through the impoundment of water of claim 1 wherein said frame is selectively buoyant.

5. The machine for power generation through the impoundment of water of claim 1, further comprising a moveable mount on top of said frame for lowering and raising said modules into pre-determined positions in said frame.

6. The machine for power generation through the impoundment of water of claim 4, wherein said frame is moveable by tug when in a positively buoyant state.

7. The machine for power generation through the impoundment of water of claim 1 wherein said modules have mating male and female connectors for vertical stacking of said modules.

8. The machine for power generation through the impoundment of water of claim 1 wherein said generating cells are mounted horizontally on said frame.

9. The machine for power generation through the impoundment of water of claim 1 wherein said frame further comprises supporting knee braces.

10. A machine for power generation through the impoundment of water comprising:
    a floatable frame disposed within a channel of impounded water;
    a plurality of power generating cells positioned in said frame in predetermined positions;
    said cells composed of interlocking selectively removable stacking modules mounted in said frame including a generator module and a turbine module; and
    said cells positioned to receive energy from the impoundment of water through said frame.

11. The machine for power generation through the impoundment of water of claim 10 further comprising a spacer module positioned in said stacking modules.

12. The machine for power generation through the impoundment of water of claim 10 further comprising a rolling bridge crane for lifting said modules into position into said frame.

13. The machine for power generation through the impoundment of water of claim 10 wherein said modules are interchangeable with each other in different positions in the frame without interrupting power in another module.

14. A gate disposed about a channel of moving or impounded water having predetermined positions for insertion of a power generating cell comprising:
   at least one modularly interchangeable selectively removable turbine into a predetermined position on said gate via a mating vertical track for stable engagement of said turbine;
   at least one electrical power generating means removably stacked in vertical position with respect to said turbine;
   at least one coupling member for engaging the at least one modularly interchangeable turbine with said power generating means to create a power generating cell;
   wherein the at least one modularly interchangeable turbine and the at least one power generating means cooperate to generate electrical power.

15. The gate disposed about a said channel of moving or mounded water of claim 14 further comprising a rotating shroud on said turbine.

16. The gate disposed about said channel of moving or impounded water of claim 14 further comprising a gantry for moving said modules into positions within said gate.

17. The gate disposed about said channel of moving or impounded water of claim 14 further comprising a hydraulically or pneumatically driven door in front of one or more of said turbines for selectively controlling flow of water through said turbine.

18. The gate disposed about said channel of moving or impounded water of claim 14 further comprising a pinion gear communicatively mounted to said turbine.

19. The gate disposed about said channel of moving or impounded water of claim 14 wherein said gate is transportable to said channel.

* * * * *